Figure 1:
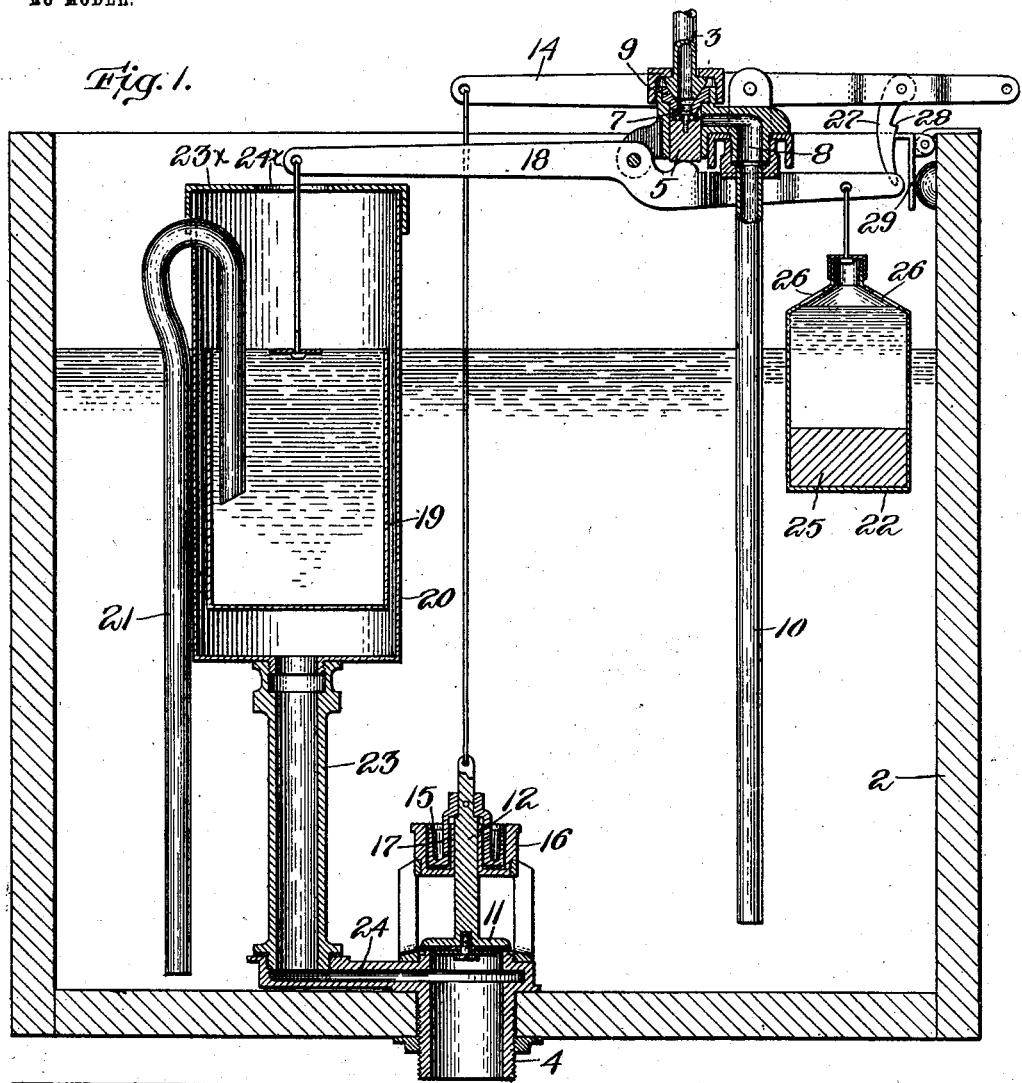

No. 755,166. PATENTED MAR. 22, 1904.
C. H. PHILLIPS.
FLUSHING TANK.
APPLICATION FILED MAY 12, 1902.
NO MODEL.

Witnesses:
Arthur F. Randall
Joseph T. Brennan

Inventor.
Chas. H. Phillips,
by E. D. Chadwick,
Attorney.

No. 755,166.                                                                 Patented March 22, 1904.

UNITED STATES PATENT OFFICE.

CHARLES H. PHILLIPS, OF MALDEN, MASSACHUSETTS.

FLUSHING-TANK.

SPECIFICATION forming part of Letters Patent No. 755,166, dated March 22, 1904.

Application filed May 12, 1902. Serial No. 106,849. (No model.)

*To all whom it may concern:*

Be it known that I, CHARLES H. PHILLIPS, a citizen of the United States, and a resident of Malden, in the county of Middlesex and State of Massachusetts, have invented certain new and useful Improvements in Flushing-Tanks, of which the following is a specification.

The present invention relates to an improvement in flushing-tanks for water-closets. Heretofore flushing-tanks for water-closets have been generally provided with means for opening and closing the inlet-valve consisting of a float connected therewith for operating the valve to open the same when the tank is emptied and close the same when the tank is filled. The floats although they have obtained in great use are principally objectionable by reason of their liability to leak. When a float leaks, even though the leak is so small as to be incapable of being discovered by ordinary means, the ball gradually fills with water, and the tank is thereby rendered inoperative. According to the present invention I have entirely avoided the use of floats for operating the inlet-valve of flushing-tanks, employing in their stead a receptacle the weight of which when filled with water operates through connections to close the inlet-valve. A receptacle which is thus filled with water avoids the objections incident to the use of float-valves above referred to, because gradual leaking will not render the apparatus inoperative. The floats are further objectionable in the form in which they are generally used by reason of the fact that they rise gradually with the rise of water in the tank and gradually close the inlet-valve, exerting only a pressure against the inlet-valve equal to the pressure of the water upon the opposite side tending to open it. This results in a closing of the valve with a pressure substantially equal to that tending to open it— that is, a balancing of pressures upon the valve. In some tank-filling devices of which I am aware the weight of water has been used to operate devices for closing the inlet-valve; but in such cases, as in the case of the float-valve, the weight of the water was nearly or exactly equal to the pressure or force tending to open the valve, resulting, as before, in a balancing of pressures upon the valve in its closed position. It is desirable in devices of this character that the inlet-valve should be closed and held closed with a pressure exceeding the pressure or forces tending to open it, and according to the present invention means are provided for filling the receptacle above referred to so that its weight shall be greater than is sufficient to close the valve and so that an excess of pressure shall be exerted thereby for maintaining the valve in its closed position—that is, the pressures or forces upon the valve are unbalanced and water-hammer in the supply-pipe upon the valve will not disturb the valve, but it will be maintained closed until that time when it is desired by the user to open the same. I am aware that it has been proposed to employ a closed vessel to receive water to operate the inlet-valve, thereby compressing the air in the vessel and increasing its weight, so that it shall operate the inlet-valve to close the same when the height of water in the tank has reached the desired level; but in such device the valve was not suitable for use in connection with flushing-tanks, being of the butterfly-throttle type, in which there is no tendency of the water-pressure either to open or close the valve, and such device would not, it is conceived, be useful in connection with valves which close against the pressure of water. Furthermore, the use of a closed receptacle is objectionable because of the excessive pressure required to force water into the vessel, owing to the resistance offered by the air contained therein. I am also aware that it has been proposed to produce an apparatus for regulating the supply of water to reservoirs that are fed from street-mains in which an apparatus for opening and closing the supply-pipe was employed which included a movable feed-tank mounted outside of the reservoir into which the supply-pipe discharged and which was connected by a flexible tube with the reservoir, so that the latter was filled from the movable feed-tank. Suitable connections between the movable feed-tank and the supply-valve were proposed, the whole being arranged so that when the reservoir was nearly filled the movable feed-tank would settle down to a level with the reservoir and through the connections close the supply-valve. Then when water was drawn from the reservoir the water flowing from the movable feed-tank through the flexible tube into the reservoir was intended to permit the said feed-tank to rise, thereby opening the supply-valve and permitting more water to flow in to replace that drawn out. This apparatus is objectionable by reason of the noise which the water flowing under high pressure into the movable feed-tank would produce. It is also objectionable by reason of the fact that the velocity of the water flowing into the movable feed-tank would exert a force thereon by the impact of the water striking the movable feed-tank, thereby rendering the device operative to close the supply-valve at different times, depending upon the pressure in the supply-pipe. Moreover, in operation the valve-operating devices will only produce a balanced closing pressure on the supply-valve, so that it would be liable to open under water-hammer in the supply-pipe.

The object, broadly stated, of my invention has been to produce a flushing-tank for water-closets in which the inlet-valve is controlled by mechanism comprising an open receptacle for water adapted to contain and retain sufficient water to close and to hold closed the inlet-valve and an automatic device for emptying the receptacle when the tank is emptied, and preferably after the tank has been emptied, and for filling the receptacle when the tank is filled, and preferably after the tank has been filled.

Another object of the invention is to provide means for refilling the bowl after the flushing-tank has been filled.

Other features of the invention will be pointed out in connection with the description thereof.

The present invention consists in the devices and combinations of devices hereinafter described, and particularly defined in the clauses of the claim.

Figure 2:
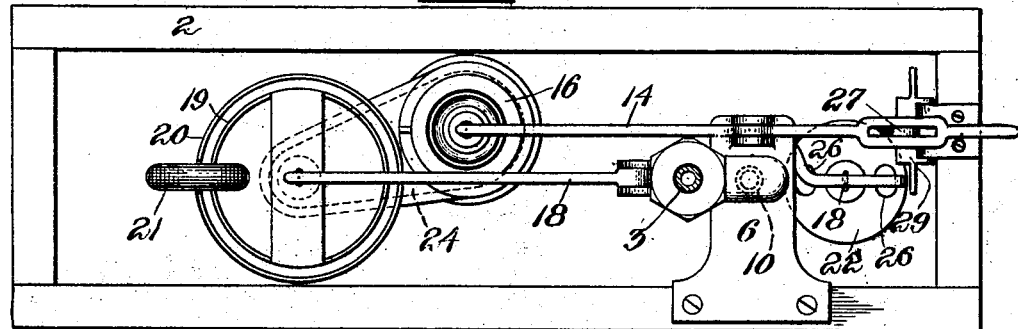

In the accompanying drawings, Figure 1 illustrates the preferred form of the invention shown in sectional elevation, and Fig. 2 is a plan view of the device shown in Fig. 1.

Referring to the embodiment of the invention illustrated in the drawings, the tank 2 consists of a rectangular box provided with an inlet-pipe 3 and an outlet-pipe 4, adapted to be connected, respectively, to a water-supply and to the closet-bowl in the usual manner. The inlet-valve is substantially the same in construction and mode of operation as the inlet-valve usually employed in flushing-tanks and known as the "ball-cock" valve, because of its usual association with the floating ball for operating it, and it consists of a piston 5, sliding in a valve-casing 6, which is secured to the tank 2 and is provided with inlet and outlet passages 7 and 8, said piston being arranged to slide past the outlet-passage and set against a suitable valve-seat 9. The outlet-passage 8 is connected to the pipe 10, which extends nearly to the bottom of the tank in order to diminish the noise caused by the inflowing water when the valve is open. The preferred form of outlet-valve comprises a valve proper, 11, secured to a suitable guide-stem 12 and arranged to close the outlet-pipe by seating against the open end thereof at 13, the valve-stem 12 being connected to the usual operating-lever 14. To said valve-stem 12 is secured a hub 15, which is adapted to enter a fixed cup 16, but is of such size and shape that small spaces are provided between itself and the bottom and sides of said cup when it enters the latter. The object of this arrangement is to diminish the shock and noise which would otherwise occur when the valve closes by causing the water in the cup 16, which is filled whenever the tank is filled, to be displaced by the entrance of the hub 15. This water escapes through the narrow spaces between said hub and cup, and thus forms a water-cushion or dash-pot, which insures the gradual closing of the valve. The cup 16 may also serve as a guide for the valve-stem 12 by having its center made tubular, as at 17, said tubular portion serving also to prevent leakage of water from said cup when the valve is open. The outlet-valve just described forms no feature of the present invention, but is described herein for the purpose of explaining the complete apparatus in which the invention is preferably embodied.

The lever 18, pivoted upon the casing 6 of the valve, is provided with a portion adapted to engage the piston 5, above referred to, and carries upon one end a counterweight 22, normally tending to turn the lever 18 in the direction to permit the pressure in the supply-pipe 3 to open the inlet-valve, and upon the other end of the said lever 18 is carried receptacle 19, adapted to contain water, and which is received within a casing 20, carried by a pipe 23, which connects by means of passage 24 with the outlet-pipe 4 and which may conveniently be referred to as an "overflow-outlet." The receptacle 19 is of such capacity that when filled with water and when the counterweight 22 is submerged, and thereby buoyed up to the extent of the weight of water which it displaces, the said receptacle exerts through the lever 18 a pressure upon the piston 5 in excess of the opposing pressure of water upon such piston. By this means the inlet-valve is closed and held closed against the pressure of the water. The casing 20 is somewhat larger than the receptacle 19, so as to permit water flowing from the receptacle 19 to fall between it and the casing and to run out through the passage 24 into the outlet-pipe for a purpose hereinafter referred to in connection with the description of the operation of the machine. The casing 20 is provided with a cover $23^x$, which has a hole 24× therein, through which a link passes, which connects the end of the lever 18 with the receptacle 19. If the water in the tank by any accident should rise above the level of the cover 24 of the casing 20, it would flow through the hole 24 into the casing 20 and through pipe 23 and passage 24 into the outlet-pipe 4.

Siphonic connections are provided for filling the receptacle 19 when the tank is filled and for emptying the receptacle when the tank is emptied. The siphonic connection consists of the tube or pipe 21, bent to form a siphon, one leg of which extends nearly to the bottom of the tank to a point below the lowest level to which the water in the tank sinks, so as to prevent floating dust or things from entering the bottom of the pipe, and the other leg of which extends downward into the receptacle 19 to a point above the position of the bottom of the receptacle 19 when it is in its highest position. The bend of the siphon 21 is located at the highest level to which the water rises in the tank. The virtues of this construction will be set forth in connection with the description of the operation of the apparatus.

The counterweight 22 consists of a receptacle provided with holes 26 near its top, through which water may flow to the inside thereof, and having at its bottom a mass 25 of greater specific gravity than water, and which is made, approximately, to balance the weight of the empty receptacle 19. The counterweight is hung so that it is immersed in the water when the tank is full. At this time, therefore, the counterweight, owing to the buoyant effect of the water which is displaced thereby, exerts a smaller pull upon the lever 18, tending to open the inlet-valve, than it does when the water has fallen in the tank, so that it no longer covers the said counterweight.

The operating-lever 14 is pivoted upon a part of the casing 6 of the inlet-valve and is connected at one end to the outlet-valve 11, and is provided at its opposite end with a connection by which it may be operated. If the operating-lever is pulled down, it will open the valve 11, and a pawl 27, provided with a shoulder 28, will catch the detent 29, pivoted upon the side of the tank 2, and hold the outlet-valve open until the end of the lever 18, which normally stands in position to engage a portion of the detent 29 and prevents it from tipping, falls, which permits said detent to turn and to release the pawl 27, holding the operating-lever 14, so that the outlet-valve may close. This provides an automatic device for closing the outlet-valve when the tank is completely empty or emptied to the extent that the inlet-valve has been opened in the manner hereinafter described. The detent 29 may be thrown out of operation, if desired, so that the outlet-valve will only be held open so long as the user desires.

The operation of the illustrated embodiment of the invention is as follows: Assuming the apparatus to be in the position illustrated in Fig. 1 ready for operation, the user pulls upon the operating-lever 14, thereby opening the outlet-valve, and the latch 27 catches upon the catch 29, the end of the lever 18 preventing the catch from tipping when the pull by the user ceases. Thus the outlet-valve is held open. The water in the tank flows rapidly out through the outlet-pipe, flushing the bowl. The siphon 21 slowly withdraws the water from the receptacle 19 and the counterweight 22 as soon as sufficient water has been withdrawn from the receptacle 19 by the siphon 21 pulls down its end of the lever 18, thereby opening the inlet-valve and permitting water to flow in through the inlet-pipe 3 to fill the tank. The siphon 21 will have emptied the receptacle 19 soon after the inlet-valve is opened, and air will be permitted to flow into the siphon 21, breaking the water column. As soon as the inlet-valve is opened the end of the lever 18 opposite the catch 29 will fall and permit the operating-lever 14 to fall, thereby permitting the valve 11 to close. The water will then continue to flow into the tank 2 until its level rises above the bend of the siphon 21, when said siphon-pipe will be filled with water and water will begin to flow into receptacle 19. As soon as a certain amount of water has flowed into receptacle 19 the counterweight 22, having a diminished effect upon the lever 18, the receptacle 19 will fall, raising the counterweight 23 and closing the inlet-valve. At this time, however, the receptacle 19 will not have been completely filled, and the level of the water in the tank being higher than the level of the water in the receptacle 19, and the two being connected by the siphon 21, water will continue to flow into receptacle, filling it, and thereby causing an excess of pressure to be exerted upon the lever 18, tending to close the inlet-valve. The arrangement and proportionate sizes of the parts are such that the level of the water in the tank when the receptacle 19 is filled will still be somewhat higher than the level of the water in the receptacle—that is, higher than the upper edge of the receptacle. Water will therefore continue to flow from the tank into the receptacle, overflowing from the receptacle into the casing 20, and passing down through pipe 23 and passage 24 will flow through the outlet-pipe 4 into the bowl and refill it. The flow into the bowl will continue only until the level of the water in the tank is lowered to the level of the upper end of the receptacle 19 in its lower position, as shown in Fig. 1. Then the levels of the two bodies of water connected by the siphon being the same, water will no longer flow from the tank into the receptacle, and by this time a sufficient flow into the bowl will have been had.

The present invention is not limited to the illustrated embodiment thereof, and, although a number of features of the preferred embodiment are of considerable practical importance and form the subject of some of the claims, the broader view of the invention is not intended to be limited thereto.

In its narrower aspects one feature of importance of the present invention consists in making the receptacle which contains the water for closing the valve an open receptacle as distinguished from a closed one, in which the water would flow in against the pressure of the air contained therein much less readily than it would into an open receptacle and requiring a considerable head to effect the flow of sufficient water to close the valve. The receptacle is located so that its upper end may be brought to the level of the water in the tank, which for compactness and simplicity of construction is a feature not to be neglected.

In its broader aspects the invention is not limited to the use of a siphon or siphonic connections for filling and emptying the valve-operating receptacle; but other means may be employed in its stead. The siphon 21 secures important advantages, which are made the subject of certain of the claims in that it provides a single device which discharges several functions. It empties the receptacle, fills the receptacle, and conveys water from the tank to the bowl for the refill.

The expression "siphonic connections" in some cases employed in the claims is intended to include any sort of siphonic connections suitable to discharge the function of the siphon 21 irrespective of whether such connections are embodied in one tube or more.

The best embodiment of the present invention known to me contemplates a siphon of restricted size compared with the size of the receptacle which its duty is to empty and to fill, so that the siphon will complete the emptying of the receptacle only after the tank has been substantially completely emptied through the outlet-valve.

One feature of novelty of the present device resides in the construction by virtue of which the filling of the receptacle begins only after the tank has been substantially filled. By this means gradual closing of the inlet-valve is avoided. By the present construction after the water reaches the level of the top of the siphon the filling of the valve-operating receptacle begins and continues uninterruptedly until completed, when the inlet-valve will be completely closed and held closed. It is to be noted that the receptacle and the siphon which fills and empties it are so constructed and arranged that the said receptacle is adapted to contain and retain sufficient water not only to close but to hold closed the inlet-valve when the tank has been filled. This provision clearly distinguishes the present construction from those tanks which periodically discharge their contents and again automatically refill to discharge again.

It is desired to point out that the excess of pressure tending to close the inlet-valve is advantageous in connection with an inlet-valve which closes against the pressure of the water and that by the present construction, no matter what the conditions of use may be, the inlet-valve will always be maintained closed when the apparatus is not in operation. Thus if a leak should occur in the receptacle it would operate to lower the level of the water in the tank, as well as in the receptacle, until the inlet-valve would be opened, and water would continue then to flow into the tank in the usual way until the tank was filled and the inlet-valve again closed by the filling of the receptacle. There would be no gradual leaking of water through the valve under pressure, and consequently there would be only a periodical refilling of the tank, and the inlet-valve would be held closed with certainty during the intervals between its opening. The consequent waste of water would be slight.

A feature of the present invention of importance consists in the construction by virtue of which the bowl is refilled after use.

One feature which contributes to the utility and advantage of the apparatus consists in the fact that the inlet-water is admitted to the tank in the first instance and the valve-operating receptacle is filled therefrom instead of, as has been proposed, admitting the water to the receptacle and permitting it to flow therefrom into the tank. The advantage is obvious that the tank being fixed the reaction of the stream of water projected thereinto does not affect the operation of the valve-operating receptacle, which if subjected to the force of a stream of incoming water would be liable to be operated thereby. It is much to be preferred for this reason and for other reasons apparent to those skilled in the art to fill the receptacle from the tank rather than to fill the tank from the receptacle.

Having thus described the invention, what is claimed is—

1. The combination with a tank having an outlet, of an inlet-valve and automatic means for opening the inlet-valve when the tank is emptied and closing the inlet-valve when the tank is filled comprising an open receptacle for water which is filled and emptied by such means, the capacity of which receptacle is such that when filled it will exert an excessive valve-closing pressure on the inlet-valve, substantially as described.

2. The combination with a tank having an outlet, of an inlet-pipe discharging directly into the tank and provided with an inlet-valve, means for opening and closing the inlet-valve comprising an open receptacle adapted to contain and retain sufficient water to close and to hold closed the inlet-valve, and automatic devices for emptying receptacle when the tank is emptied and for filling the receptacle from the tank when the tank is filled, substantially as described.

3. The combination with a tank having an outlet, of an inlet-pipe discharging directly into the tank and provided with an inlet-valve, means for operating the inlet-valve comprising an open receptacle for water the weight of which is adapted to close the inlet-valve and means for filling said receptacle from the tank to close the inlet-valve when the tank is filled and to empty said receptacle to open the inlet-valve when the tank is emptied, substantially as described.

4. The combination with a tank having an outlet, of an inlet-valve, means for opening and closing the inlet-valve comprising a receptacle adapted to contain and retain sufficient water to close and hold closed the inlet-valve and automatic devices for emptying the receptacle when the tank is emptied and for filling the receptacle when the tank is filled, operating to retard the emptying of the receptacle so that the emptying shall not be complete until the tank is substantially emptied, substantially as described.

5. The combination with a tank having an outlet, of an inlet-valve, means for opening and closing the inlet-valve comprising an open receptacle adapted to contain and retain sufficient water to close and hold closed the inlet-valve, and a siphon connecting the receptacle with the tank operating to empty the receptacle when the tank is emptied and to fill the receptacle when the tank is filled, substantially as described.

6. The combination with a tank having an outlet, of an inlet-valve, means for opening and closing the inlet-valve comprising an open receptacle adapted to contain sufficient water to close the inlet-valve and a siphon for filling the receptacle when the tank is filled constructed and arranged to empty the receptacle after the tank has been emptied, said receptacle being of such capacity that when partially filled it will operate to close the inlet-valve, and when completely filled will operate to exert an excess of pressure upon the inlet-valve to hold it closed, substantially as described.

7. The combination with a tank having an outlet, of an inlet-valve, means for opening and closing the inlet-valve comprising an open receptacle adapted to contain and retain sufficient water to close and hold closed the inlet-valve and siphonic connections between the receptacle and the tank operating to empty the receptacle when the tank is emptied and to fill the receptacle after the tank has been filled, substantially as described.

8. The combination with a tank having an outlet, of an inlet-valve and means for opening and closing the inlet-valve comprising an open receptacle the capacity of which is such that when filled it will exert an excessive valve-closing pressure on the inlet-valve and siphonic connections between the receptacle and the tank operating to empty the receptacle when the tank is emptied and to fill the receptacle from the tank after the tank has been filled, substantially as described.

9. A flushing-tank having, in combination a tank provided with an outlet of an inlet-pipe provided with an inlet-valve, said inlet-valve operating to close against the pressure of the supply-water, a lever for operating the inlet-valve, an open receptacle hung upon said lever, said receptacle having a capacity such that when filled with water it will exert a pressure upon the inlet-valve greater than the pressure of the water opposed to it, and connections between the tank and the receptacle for emptying the receptacle when the tank is emptied and for filling the receptacle when the tank is filled, substantially as described.

10. The combination with a tank provided with an outlet, of an inlet-pipe provided with an inlet-valve, said inlet-valve operating to close against the pressure of the supply-water, a lever for operating the inlet-valve, an open receptacle for water hanging on said lever, a siphon having one leg extended nearly to the bottom of the tank and below the lowest level of the water in the tank and having the other leg extending into said receptacle, the bend in the siphon being located at the highest level of the water in the tank, said siphon operating to fill the receptacle and close the inlet-valve when the water in the tank rises to the highest level, and thereafter to lower the level in the tank by discharging it into the receptacle, substantially as described.

11. The combination with a tank having an outlet, of an inlet-valve, means for opening and closing the inlet-valve comprising a receptacle for water and automatic devices for emptying the receptacle when the tank is emptied and filling the receptacle when the tank is filled acting to deliver an additional amount of water to refill the bowl, substantially as described.

12. The combination with a tank having an outlet, of an inlet-valve, means for opening and closing the inlet-valve comprising a receptacle, a casing therefor having an outlet to the bowl, and automatic devices for emptying the receptacle when the tank is emptied and filling the receptacle when the tank is filled acting to deliver an additional amount of water to refill the bowl, substantially as described.

13. The combination with a tank having an outlet, of an inlet-valve, means for opening and closing the inlet-valve comprising an open receptacle adapted to contain sufficient water to close the inlet-valve, and siphonic connections for emptying the receptacle when the tank is emptied and for filling the receptacle when the tank is filled, said receptacle and siphonic connections being constructed and arranged so that the filling of the receptacle is started only when the tank has been filled to a predetermined level and continues beyond the time necessary to fill the receptacle so that additional water is supplied to refill the bowl, substantially as described.

14. The combination with a tank having a supply-inlet and a valve controlling the same, of a valve-operating lever, a receptacle suspended therefrom and arranged to exert a valve-closing force on the inlet-valve, means for withdrawing liquid from said receptacle when the tank empties and for supplying liquid to said receptacle when the tank fills, and a second receptacle suspended from said lever and arranged and weighted to counterbalance the valve-closing receptacle when empty, said second receptacle being normally filled with liquid and so located as to extend below the normal level of liquid within the tank, substantially as described.

15. The combination with a tank having an inlet and an outlet and valves controlling the same, of means for opening the inlet-valve when the tank empties and for closing said valve when the tank fills, an operating-lever connected to the outlet-valve, a latch pivoted to said lever and provided with a shoulder, a pivoted catch arranged to engage said shoulder when the outlet-valve is opened, and an arm movable with the means which control the inlet-valve and located in front of said catch when the inlet-valve is closed, substantially as described.

16. The combination with a tank having an inlet and an outlet and valves controlling the same, of means for operating the inlet-valve comprising a receptacle the weight of which is adapted to exert a closing force on said inlet-valve, means for withdrawing liquid from said receptacle when the tank empties and for supplying liquid to said receptacle when the tank fills, a latch arranged to hold the outlet-valve open, and means operative with the emptying of the receptacle for releasing said latch, substantially as described.

17. The combination with a tank having a supply-inlet and an outlet and valves controlling the same, of a lever controlling the inlet-valve, a receptacle suspended from said lever and arranged to exert a valve-closing force on said inlet-valve, a casing surrounding said receptacle and protecting the same from the buoyant effect of liquid in the tank, and a siphon having its longer leg located in the tank and its shorter leg located in the receptacle, substantially as described.

In testimony whereof I have hereunto subscribed my name this 9th day of May, 1902.

CHAS. H. PHILLIPS.

Witnesses:
   EDWIN E. BARTLETT,
   E. D. CHADWICK.